United States Patent
Airaksinen et al.

(10) Patent No.: US 12,097,448 B2
(45) Date of Patent: Sep. 24, 2024

(54) CHROMATOGRAPHIC SEQUENTIAL SIMULATED MOVING BED FRACTIONATION OF A FEEDSTOCK

(71) Applicant: DUPONT NUTRITION BIOSCIENCES APS, Copenhagen K (DK)

(72) Inventors: Jyrki Airaksinen, Kantvik (FI); Kari Laiho, Kantvik (FI)

(73) Assignee: International N&H Denmark APS, Kongens Lyngby (DK)

(*) Notice: Subject to any disclaimer, the term of this patent is extended or adjusted under 35 U.S.C. 154(b) by 530 days.

(21) Appl. No.: 17/330,652

(22) Filed: May 26, 2021

(65) Prior Publication Data
US 2021/0291075 A1 Sep. 23, 2021

Related U.S. Application Data

(63) Continuation of application No. 15/524,637, filed as application No. PCT/US2015/059517 on Nov. 6, 2015, now abandoned.

(30) Foreign Application Priority Data

Nov. 7, 2014 (GB) .................................. 1419852

(51) Int. Cl.
*B01D 15/18* (2006.01)
*B01D 15/36* (2006.01)
(Continued)

(52) U.S. Cl.
CPC ....... *B01D 15/1828* (2013.01); *B01D 15/185* (2013.01); *B01D 15/362* (2013.01);
(Continued)

(58) Field of Classification Search
CPC .............. B01D 15/1828; B01D 15/185; B01D 15/362; B01D 2215/024; B01D 15/08; C13B 20/148; C13B 35/06; C13K 13/007
(Continued)

(56) References Cited

U.S. PATENT DOCUMENTS

| 2,985,589 A | 5/1961 | Broughton et al. |
| 4,412,866 A | 11/1983 | Sakaguchi et al. |

(Continued)

FOREIGN PATENT DOCUMENTS

| EP | 2108423 A1 | 10/2009 |
| EP | 2227303 A1 | 9/2010 |

(Continued)

OTHER PUBLICATIONS

International Search Report, PCT International Application No. PCT/US2015/059517, Mailed May 12, 2016.

*Primary Examiner* — Madeline Gonzalez

(57) ABSTRACT

The present invention relates to a method for fractionating a feedstock into two or more fractions enriched with different components, and more particularly to a method for fractionating a feedstock into two or more fractions by a chromatographic sequential simulated moving bed (SMB) system, wherein the SMB system comprises a separation loop comprising at least 2 compartments; and wherein the method comprises a separation cycle comprising at least one feeding step, at least one circulating step and at least one eluting step; wherein the dissolved substances in the feedstock form a separation profile as they progress through the separation loop; and the separation profile is progressed more than once or less than once through the separation loop in each separation cycle; and wherein at least two flow paths are present in the separation loop during each feeding step of the separation cycle; and at least one of said flow paths is an active flow path and at least one of said flow paths is an inactive flow path.

26 Claims, 9 Drawing Sheets

F = Feed
W = water
P = product

Shading = active flow
No shading = no active flow

____ = flow path between compartments
(Interconnections between compartments not shown)

(51) Int. Cl.
*C13B 20/14* (2011.01)
*C13B 35/06* (2011.01)
*C13K 13/00* (2006.01)

(52) U.S. Cl.
CPC ............ *C13B 20/148* (2013.01); *C13B 35/06* (2013.01); *C13K 13/007* (2013.01); *B01D 2215/024* (2013.01)

(58) Field of Classification Search
USPC .............................. 210/659, 656, 672, 198.2
See application file for complete search history.

(56) References Cited

U.S. PATENT DOCUMENTS

| | | | |
|---|---|---|---|
| 5,064,539 A | 11/1991 | Tanimura et al. | |
| 5,466,294 A | 11/1995 | Kearney et al. | |
| 5,556,546 A * | 9/1996 | Tanimura | B01D 15/1828 |
| | | | 210/659 |
| 5,637,225 A | 6/1997 | Heikkiläet al. | |
| 5,795,398 A | 8/1998 | Hyoky et al. | |
| 6,093,326 A | 7/2000 | Heikkiläet al. | |
| 6,224,776 B1 | 5/2001 | Heikkiläet al. | |
| 6,663,780 B2 | 12/2003 | Heikkiläet al. | |
| 6,896,811 B2 | 5/2005 | Heikkiläet al. | |
| 7,959,811 B2 | 6/2011 | Airaksinen et al. | |
| 2003/0094416 A1 | 5/2003 | Heikkiläet al. | |

FOREIGN PATENT DOCUMENTS

| | | |
|---|---|---|
| EP | 2772289 A1 | 9/2014 |
| FI | 86416 B | 8/1992 |
| WO | 1997045185 A1 | 12/1997 |
| WO | 2002089946 A1 | 11/2002 |
| WO | 2004060526 A1 | 7/2004 |

* cited by examiner

Fig. 1
1A
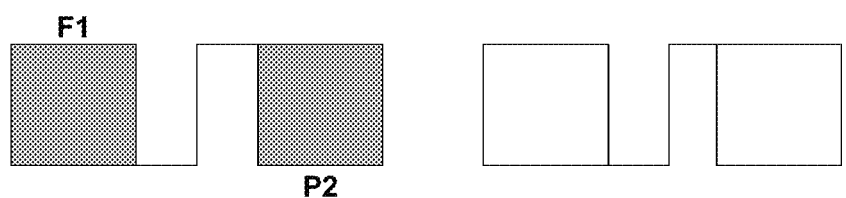
1B
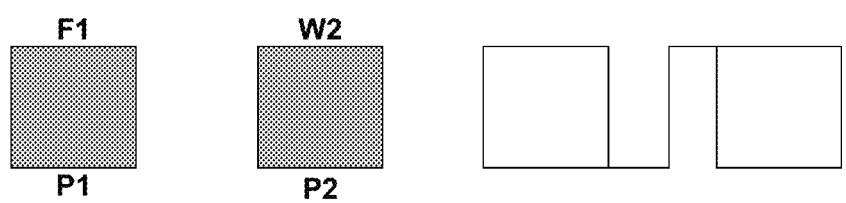
1C
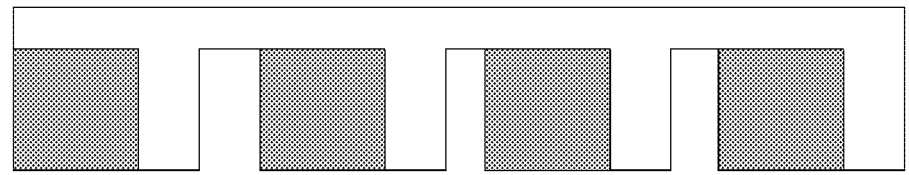
F = Feed
W = water
P = product
Shading = active flow
No shading = no active flow
_____ = flow path between compartments
(Interconnections between compartments not shown)

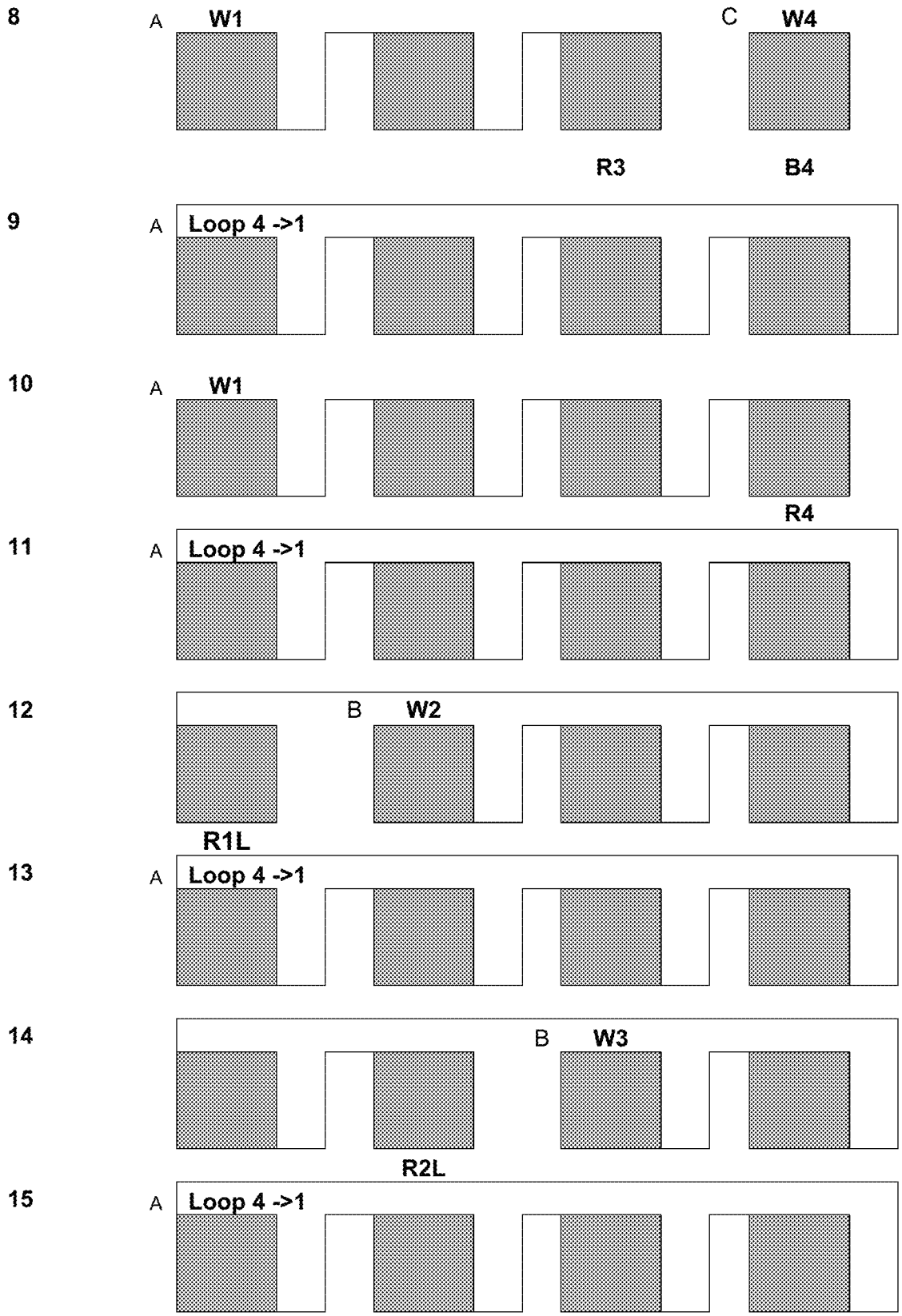

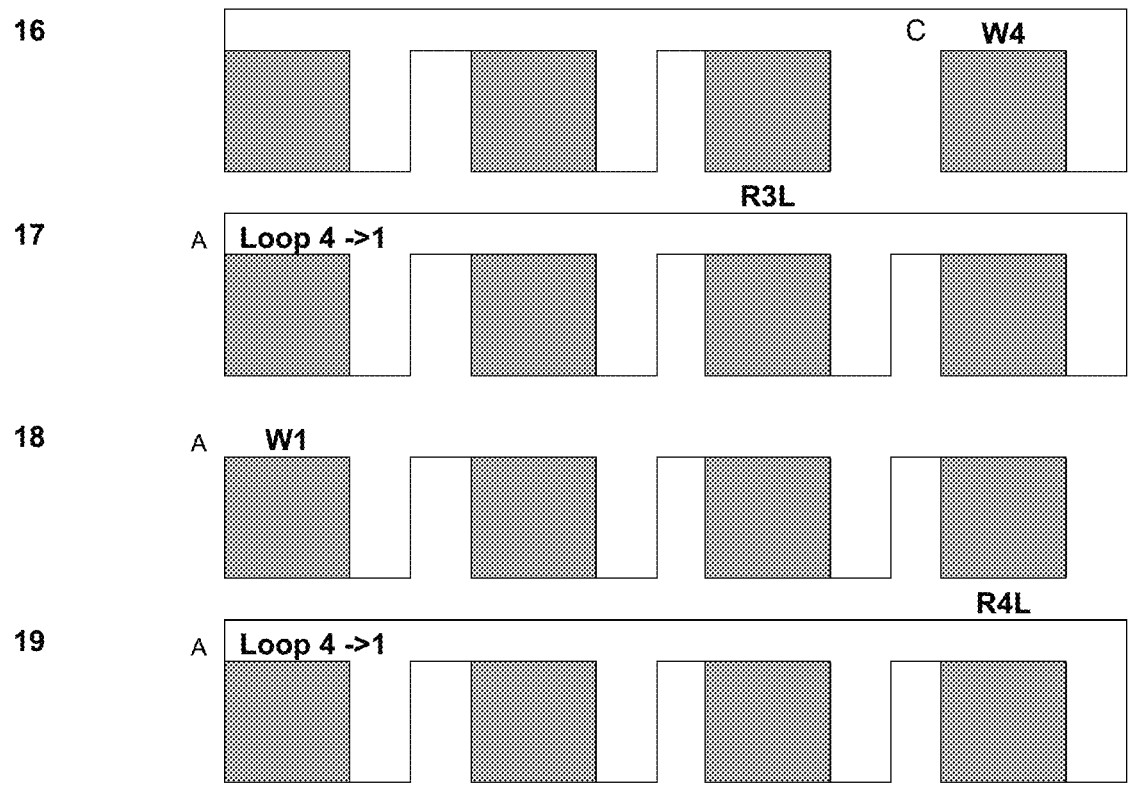
F = Feed
W = Water
B = Betaine
D = Recycle
E = Sucrose
R = Raffinate
Shading = active flow
No shading = no active flow
_____ = flow path between compartments
(Interconnections between compartments not shown)

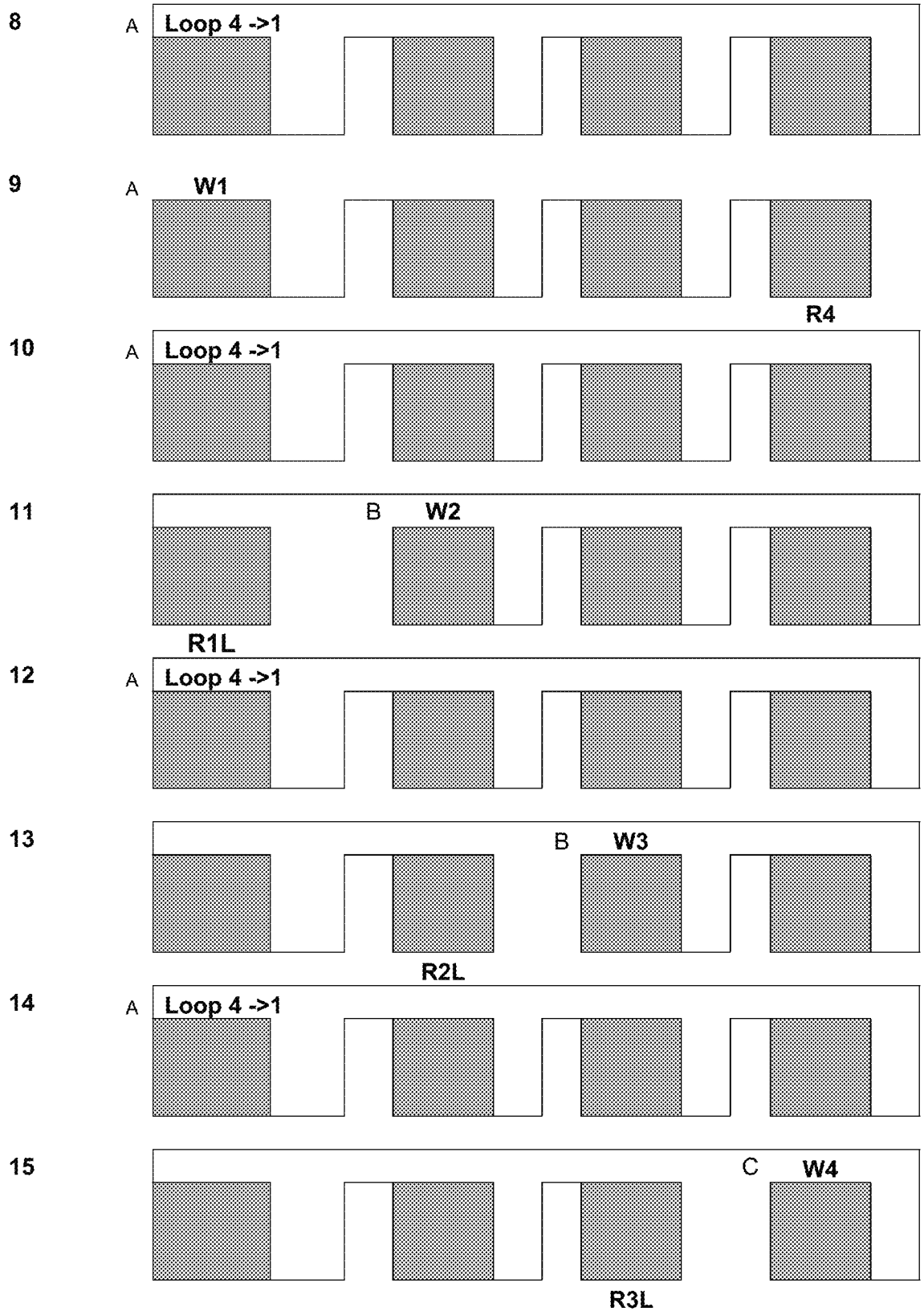

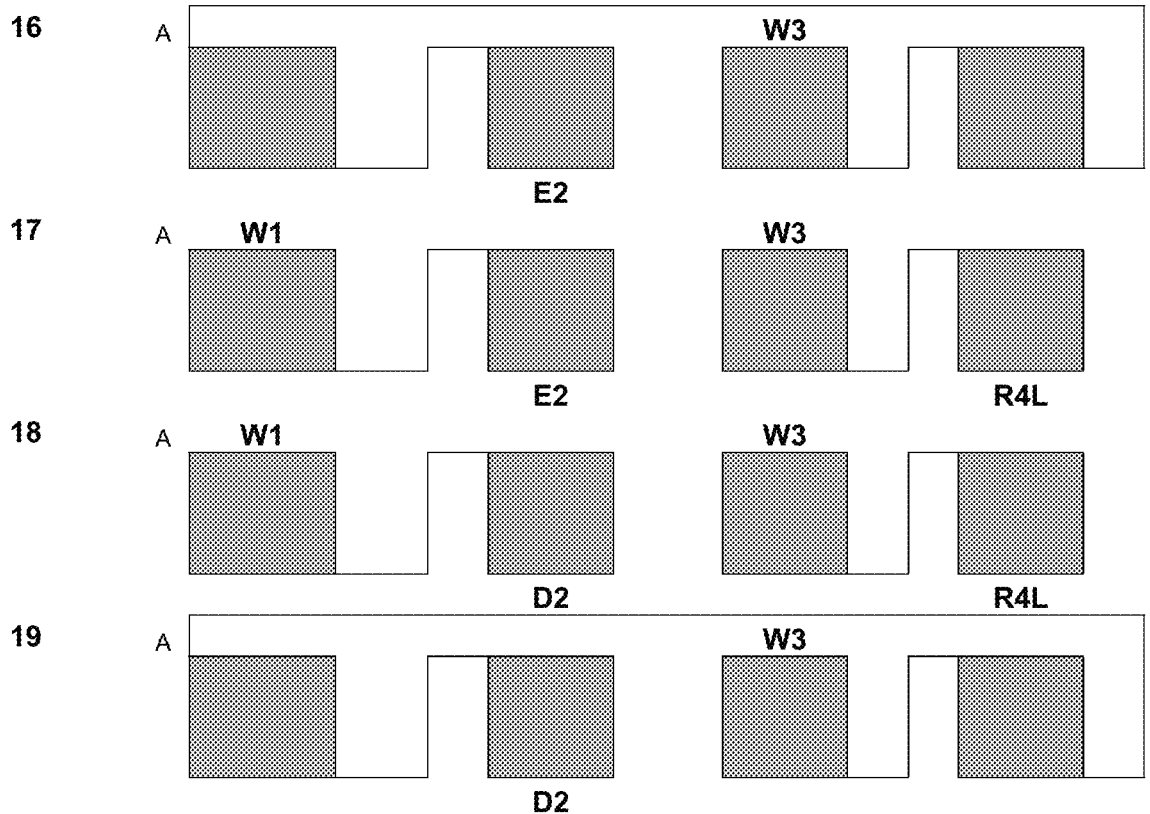

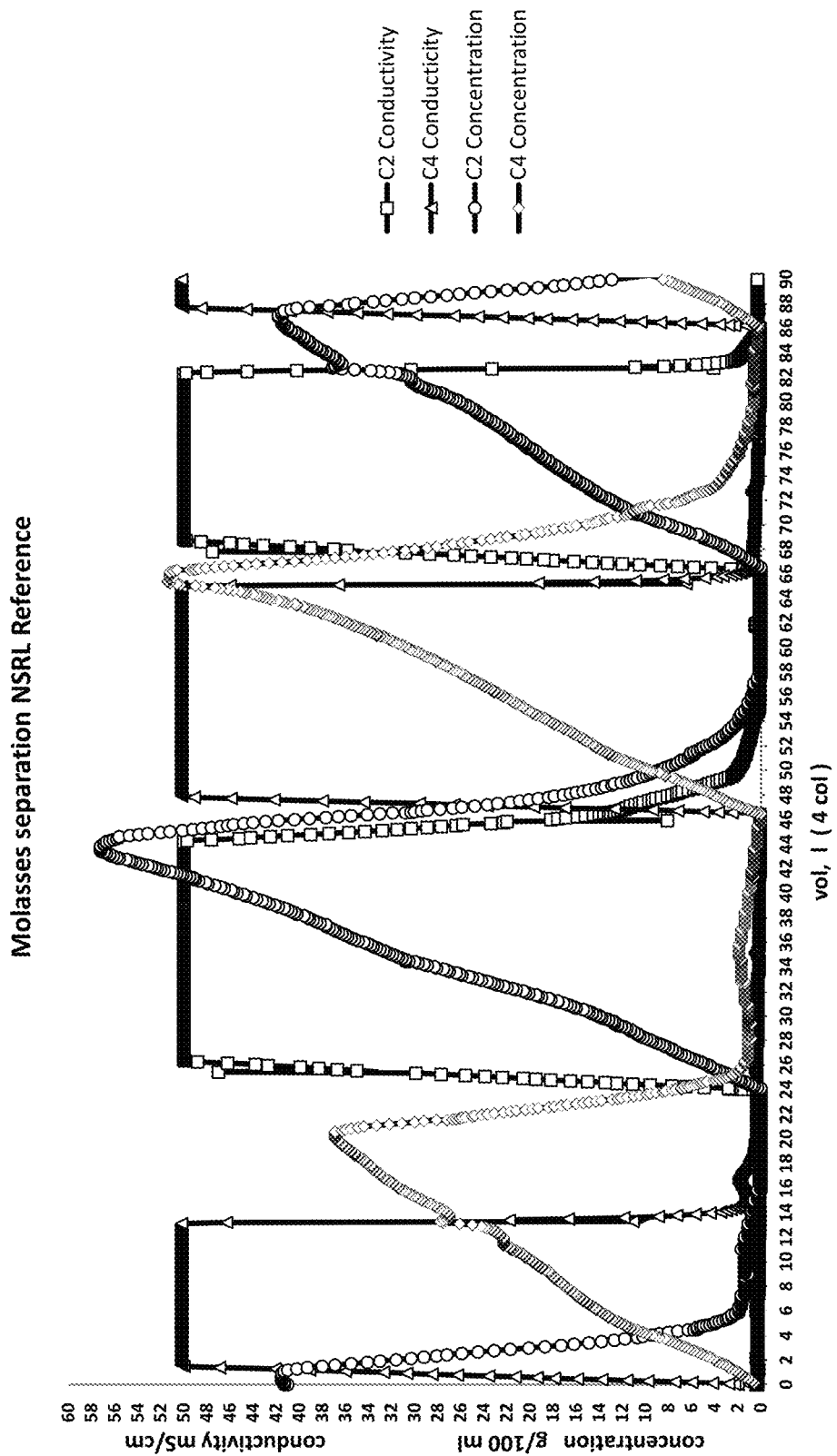

CHROMATOGRAPHIC SEQUENTIAL SIMULATED MOVING BED FRACTIONATION OF A FEEDSTOCK

CROSS-REFERENCE TO RELATED APPLICATIONS

The present application is a continuation of U.S. patent application Ser. No. 15/524,637, filed May 5, 2017, which is a national application filed under 35 U.S.C. 371 of International Application No. PCT/US2015/059517, filed Nov. 6, 2015, which claims priority to Great Britain Application No. 1419852.7, filed Nov. 7, 2014, all of which are hereby incorporated by reference.

FIELD OF THE INVENTION

The present invention relates to a method for fractionating a feedstock into two or more fractions enriched with different components, and more particularly to a method for fractionating a feedstock into two or more fractions by a chromatographic sequential simulated moving bed (SMB) system, wherein the SMB system comprises a separation loop comprising at least 2 compartments; and wherein the method comprises a separation cycle comprising at least one feeding step, at least one circulating step and at least one eluting step; wherein the dissolved substances in the feedstock form a separation profile as they progress through the separation loop; and the separation profile is progressed more than once or less than once through the separation loop in each separation cycle; and wherein at least two flow paths are present in the separation loop during each feeding step of the separation cycle; and at least one of said flow paths is an active flow path and at least one of said flow paths is an inactive flow path.

BACKGROUND OF THE INVENTION

Continuous simulated moving bed chromatograph has been disclosed in U.S. Pat. No. 2,985,589 (Broughton et al.). In this process the mixture to be fractionated is introduced into one chromatographic resin bed and eluent is introduced into another chromatographic resin bed, and two product fractions are withdrawn substantially simultaneously. There are at least four chromatographic resin beds, forming a single chromatographic separation loop with continuous circulation of a separation profile, and the feed and product withdrawal points are shifted continuously and stepwise in the downstream direction, essentially at the speed of the circulation of the separation profile in the chromatographic separation loop.

For simulated moving bed chromatographic separation processes two or more loop and two or more profile modes have been developed in order to better utilise the chromatographic separation resin bed to achieve increased separation capacity, increased yields and fraction purities and fraction dry substance concentrations.

A sequential simulated moving bed process applied to the recovery of betaine and sucrose from beet molasses is described in Finnish Patent 86 416. In this method, one complete or essentially complete separation profile is circulated in a chromatographic separation system.

Finnish Patent 86 416 discloses a method for recovering betaine and sucrose from beet molasses employing a simulated moving bed process. The chromatographic system comprises at least three chromatographic resin beds in series. Betaine and sucrose are separated in the same separation sequence comprising a molasses feeding phase wherein the molasses feedstock is supplied to one of said chromatographic resin beds and eluent water is supplied substantially simultaneously to another of said chromatographic resin beds, an eluting phase, and a circulating phase. These phases are repeated either once or several times during the separation sequence.

Also, U.S. Pat. Nos. 6,093,326 and 5,637,225 relate to simulated moving bed methods. U.S. Pat. No. 6,093,326 relates to the fractionation of molasses and U.S. Pat. No. 5,637,225 to the fractionation of sulphite cooking liquor. As is described in these publications, the simulated moving bed method may include multiple chromatographic separation loops, and multiple separation profiles in each loop.

In the method disclosed in U.S. Pat. No. 6,093,326, the liquid flow is effected in a system comprising at least two chromatographic resin beds, and the product or products are recovered during a multistep sequence. A separation cycle comprises feeding, eluting and circulating phases. During the circulating phase, the liquid present in the chromatographic resin beds is circulated in two or more separation loops comprising one, two or more chromatographic resin beds.

WO 1997045185 discloses a method for fractionating a solution into two or more fractions by a chromatographic simulated moving bed process, wherein at least two separation profiles are circulated in the same loop. The method can be used for fractionating a sulphite cooking liquor to give a fraction rich in monosaccharides and/or a fraction rich in lignosulphonates. Furthermore, molasses or vinasse can be fractionated in that way to obtain fractions rich in sugar, such as sucrose, and/or betaine. The minimum bed length required for the method is at least the length of two separation profiles without excess overlapping.

WO 2002089946 describes a method for fractionating a solution into two or more fractions by a sequential moving bed process wherein the separation profile is circulated through the columns more than once or less than once. In the methods exemplified therein, each feeding step employs all of the compartments in the chromatographic separation loop.

There is a need in the art for further methods capable of providing good separation of complex mixtures providing product fractions of high yield and purity and good product fraction concentration.

The present invention provides alternative/improved separation methods which provide one or more of the following advantageous effects: high product fraction yields, high product fraction purities, high product fraction concentrations and high separation capacities.

SUMMARY OF THE INVENTION

In one aspect of the present invention there is provided a method for fractionating a feedstock into two or more fractions by a chromatographic sequential simulated moving bed (SMB) system, wherein the SMB system comprises a separation loop comprising at least 2 compartments; and wherein the method comprises a separation cycle comprising at least one feeding step, at least one circulating step and at least one eluting step;

wherein the dissolved substances in the feedstock form a separation profile as they progress through the separation loop; and the separation profile is progressed more than once or less than once through the separation loop in each separation cycle; and wherein at least two flow paths are present in the separation loop during each feeding step of the separation cycle; and at least one of said flow paths is an active flow path and at least one of said flow paths is an inactive flow path.

In other aspects of the invention there are provided chromatographic fractions comprising betaine or sucrose as defined herein obtainable by the method according to the above aspect of the invention.

BRIEF DESCRIPTION OF THE DRAWINGS

FIG. 1 depicts examples of possible flow paths in a four compartment SMB system.

FIG. 4 depicts the separation profile formed in the separation cycle of Example 1.

DETAILED DESCRIPTION OF THE INVENTION

Feedstock

Figure 2:
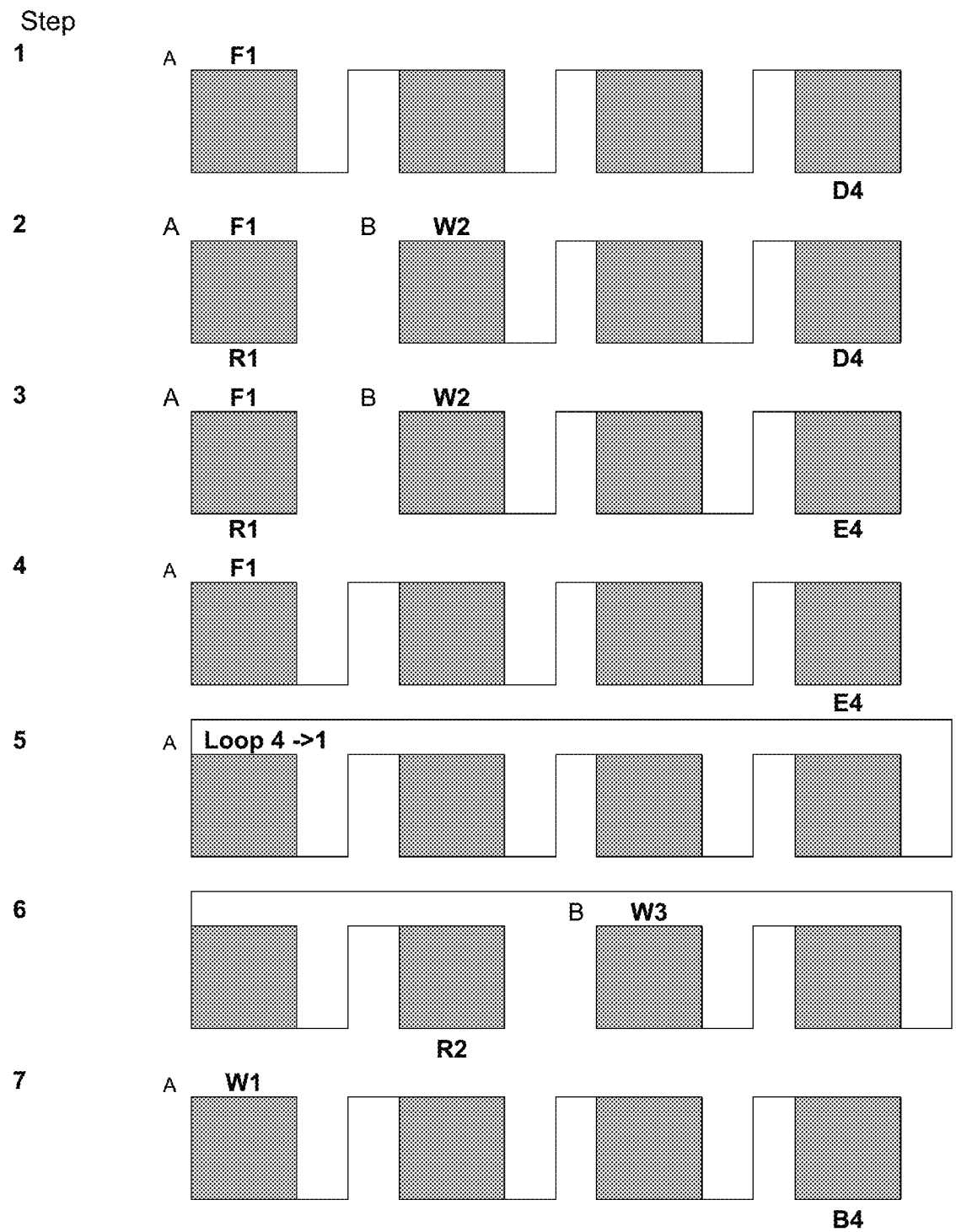
FIG. 2 depicts the steps in the separation cycle of Example 1.

As used herein, 'feedstock' refers to the material which is the subject of chromatographic purification. In one embodiment, the feedstock may be a raw material. In another embodiment, the feedstock may be partially purified, recycled material resulting from chromatographic methods (recycle fraction). In another embodiment, the feedstock may be a mixture of raw material and recycle fraction.

In one embodiment, the feedstock is a solution comprising a mixture of components.

In one embodiment, the feedstock may be selected from sulphite cooking liquors, beet molasses, especially B-molasses and C-molasses, low green, vinasse, fructose/glucose syrups, beet-derived juices, invert sugar mixtures, starch hydrolysates, wood hydrolysates, milk whey solutions and other lactose-containing solutions, lactulose-containing solutions, maltose-containing solutions, maltitol-containing solutions, solutions containing amino acids, fermentation broths containing various organic acids, such as citric acid, gluconic acid, bagasse hydrolysates, and solutions containing rhamnose, arabinose, mannose, raffinose, inositol, mannitol, sorbitol, xylitol, erythritol, glutamic acid, glycerol and/or tagatose, and isomaltulose and trehalulose solutions and the like.

Preferably the feedstock is selected from sulphite cooking liquor, beet molasses and low green. More preferably, the feedstock is beet molasses or low green.

In this context sulphite cooking liquor means a liquor employed in the cooking of sulphite cellulose or a part thereof, a liquor ensuing from the cooking or a part thereof, a liquor used in the sulphite cooking or a part thereof or liquor removed from the sulphite cooking during the cooking or a part thereof.

Fractions

Fractions withdrawn may include product fractions, i.e. fractions sufficiently enriched in one of the products of interest, and recycle fractions, i.e. fractions which are intended to be re-purified.

The fractions produced by the method of the present invention may be enriched in products selected from the group consisting of glucose, fructose, sucrose, betaine, rhamnose, arabinose, mannose, raffinose, lactose, lactulose, maltose, maltitol, inositol, mannitol, glycerol, xylitol, xylose, sorbitol, erythritol, organic acids, especially amino acids, such as glutamic acid. When these fractions are sufficiently enriched (i.e. product purity is 80 wt. % or more of dry substance, preferably 85 wt. % or more of dry substance, more preferably 90 wt. % or more of dry substance), these fractions may be referred to as product fractions.

Alternatively, fractions produced by the method of the invention may be recycled back to the compartments/column(s) or combined with raw material. There may also be an operation before returning these fractions to the separation system, for example they may be concentrated by evaporation. These fractions may be referred to as recycle fractions.

In the method of the present invention, there may be more than one product of interest and therefore more than one type of product fraction.

In one embodiment, the method of the invention provides fractions enriched in sucrose and fractions enriched in betaine.

In one embodiment, the method uses beet molasses as a feedstock and the product fractions are enriched in betaine or sucrose.

Preferably the product fraction enriched in sucrose has a sucrose concentration of at least about 20 g/100 ml, more preferably at least about 23 g/100 ml, more preferably at least about 25 g/100 ml, more preferably at least about 28 g/100 ml, more preferably at least about 30 g/100 ml, more preferably at least about 31 g/100 ml, more preferably at least about 33 g/100 ml, more preferably at least about 35 g/100 ml.

Preferably the product fraction enriched in sucrose has a sucrose purity of 80 wt. % or more of dry substance, preferably 85 wt. % or more of dry substance, more preferably 90 wt. % or more of dry substance, more preferably from 90 to 95 wt. % of dry substance.

Preferably the product fraction enriched in betaine has a betaine concentration of at least about 2.5 g/100 ml, more preferably at least about 2.8 g/100 ml, more preferably at least about 3 g/100 ml, more preferably at least about 3.2 g/100 ml, more preferably at least about 3.4 g/100 ml, more preferably at least about 3.5 g/100 ml, more preferably at least about 3.6 g/100 ml, more preferably about 3.6 g/100 ml, more preferably at least about 3.8 g/100 ml, more preferably about 3.8 g/100 ml, more preferably at least about 4.0 g/100 ml, more preferably about 4.0 g/100 ml.

Preferably the product fraction enriched in betaine has a betaine purity of 70 wt. % or more of dry substance, preferably 75 wt. % or more of dry substance, more preferably 80 wt. % or more of dry substance, more preferably from 890 to 85 wt. % of dry substance.

In another aspect, the present invention provides a chromatographic fraction comprising at least about 75 wt. % betaine of dry substance and having a betaine concentration of at least about 2.5 g/100 ml, more preferably at least about 2.8 g/100 ml, more preferably at least about 3 g/100 ml, more preferably at least about 3.2 g/100 ml, more preferably at least about 3.4 g/100 ml, more preferably at least about 3.5 g/100 ml, more preferably at least about 3.6 g/100 ml, more preferably about 3.6 g/100 ml, more preferably at least about 3.8 g/100 ml, more preferably about 3.8 g/100 ml, more preferably at least about 4.0 g/100 ml, more preferably about 4.0 g/100 ml, obtainable by the method of the invention.

In another aspect, the present invention provides a chromatographic fraction comprising at least about 80 wt. % betaine of dry substance and having a betaine concentration of at least about 2.5 g/100 ml, more preferably at least about 2.8 g/100 ml, more preferably at least about 3 g/100 ml, more preferably at least about 3.2 g/100 ml, more preferably at least about 3.4 g/100 ml, more preferably at least about 3.5 g/100 ml, more preferably at least about 3.6 g/100 ml, more preferably about 3.6 g/100 ml, more preferably at least about 3.8 g/100 ml, more preferably about 3.8 g/100 ml, more preferably at least about 4.0 g/100 ml, more preferably about 4.0 g/100 ml, obtainable by the method of the invention.

In another aspect, the present invention provides a chromatographic fraction comprising at about 80 to about 85 wt. % betaine of dry substance and having a betaine concentration of at least about 2.5 g/100 ml, more preferably at least about 2.8 g/100 ml, more preferably at least about 3 g/100 ml, more preferably at least about 3.2 g/100 ml, more preferably at least about 3.4 g/100 ml, more preferably at least about 3.5 g/100 ml, more preferably at least about 3.6 g/100 ml, more preferably about 3.6 g/100 ml, more preferably at least about 3.8 g/100 ml, more preferably about 3.8 g/100 ml, more preferably at least about 4.0 g/100 ml, more preferably about 4.0 g/100 ml, obtainable by the method of the invention.

In another aspect, the present invention provides a chromatographic fraction comprising at least about 85 wt. % sucrose of dry substance and having a sucrose concentration of at least about 20 g/100 ml, more preferably at least about 23 g/100 ml, more preferably at least about 25 g/100 ml, more preferably at least about 28 g/100 ml, more preferably at least about 30 g/100 ml, more preferably at least about 31 g/100 ml, more preferably at least about 33 g/100 ml, more preferably at least about 35 g/100 ml obtainable by the method of the invention.

In another aspect, the present invention provides a chromatographic fraction comprising at least about 90 wt. % sucrose of dry substance and having a sucrose concentration of at least about 20 g/100 ml, more preferably at least about 23 g/100 ml, more preferably at least about 25 g/100 ml, more preferably at least about 28 g/100 ml, more preferably at least about 30 g/100 ml, more preferably at least about 31 g/100 ml, more preferably at least about 33 g/100 ml, more preferably at least about 35 g/100 ml obtainable by the method of the invention.

In another aspect, the present invention provides a chromatographic fraction comprising at about 90 to about 95 wt. % sucrose of dry substance and having a sucrose concentration of at least about 20 g/100 ml, more preferably at least about 23 g/100 ml, more preferably at least about 25 g/100 ml, more preferably at least about 28 g/100 ml, more preferably at least about 30 g/100 ml, more preferably at least about 31 g/100 ml, more preferably at least about 33 g/100 ml, more preferably at least about 35 g/100 ml obtainable by the method of the invention.

SMB System

As used herein, 'SMB system' refers to the equipment which enables fractionation of the feedstock and which operates according to the principles of a simulated moving bed (SMB).

An SMB system typically comprises at least two compartments connectable in series and the connecting pipelines. An SMB system may furthermore comprise pumps, eluent containers, feed and eluent conduits, circulation apparatus, heat exchangers, product fraction withdrawal conduits, valves, flow and pressure regulators and devices capable of measuring concentration, density, optical activity and conductivity. Suitable systems would be well known to the skilled person.

As used herein, 'compartment' refers to a section of chromatographic equipment comprising a stationary phase.

In one embodiment, a compartment may further comprise, in addition to the stationary phase, a forepart for distributing incoming liquid flow onto the stationary phase (distribution device) and a rear part for collecting the outgoing liquid flow from the stationary phase (collection device).

Suitable distribution and collection devices have been disclosed in WO2004060526 which is herein incorporated by reference.

One or more compartments may be arranged in a column. When a column contains only one compartment the two terms may be used interchangeably.

The compartments are interconnected such that they form a separation loop. As used herein a "separation loop" refers to a circuit of compartments which are interconnected such that the inlet of any given compartment is connected to the outlet of the preceding compartment and the outlet of said compartment is connected to the inlet of the proceeding compartment.

In one embodiment, the SMB system comprises a separation loop comprising 2 to 28 compartments, preferably 2 to 15 compartments, more preferably 2 to 12 compartments, more preferably 2 to 10 compartments, more preferably 2 to 8 compartments, more preferably 2 to 6 compartments, more preferably 2 to 4 compartments.

In one embodiment, the SMB system comprises a separation loop comprising at least three compartments.

In one embodiment, the SMB system comprises a separation loop comprising 3 to 28 compartments, preferably 3 to 15 compartments, more preferably 3 to 12 compartments, more preferably 3 to 10 compartments, more preferably 3 to 8 compartments, more preferably 3 to 6 compartments, more preferably 3 or 4 compartments.

In one embodiment, the SMB system comprises a separation loop comprising at least four compartments.

In one embodiment, the SMB system comprises a separation loop comprising 4 to 28 compartments, preferably 4 to 15 compartments, more preferably 4 to 12 compartments, more preferably 4 to 10 compartments, more preferably 4 to 8 compartments, more preferably 4 to 6 compartments, more preferably 4 or 5 compartments.

In one embodiment, the SMB system comprises a separation loop comprising at least five compartments.

In one embodiment, the SMB system comprises a separation loop comprising 5 to 28 compartments, preferably 5 to 15 compartments, more preferably 5 to 12 compartments, more preferably 5 to 10 compartments, more preferably 5 to 8 compartments, more preferably 5 or 6 compartments.

In one embodiment, the SMB system comprises a separation loop comprising at least six compartments.

In one embodiment, the SMB system comprises a separation loop comprising 6 to 28 compartments, preferably 6 to 15 compartments, more preferably 6 to 12 compartments, more preferably 6 to 10 compartments, more preferably 6 to 8 compartments.

In a preferred embodiment, the separation loop comprises/consists of four compartments.

Flow Path

As used herein, 'flow path' refers to a temporary route via which liquid may flow. A flow path can be created within the separation loop due to the manipulation of the valves controlling the various inlets and outlets of each compartment in the separation loop.

A flow path may be comprised of one compartment or more than one compartment connected in series.

A flow path may be an active flow path or an inactive flow path.

As used herein, an 'active flow path' refers to a flow path wherein liquid is actively flowing (e.g. being pumped) through the compartment(s) which constitute the flow path. In an active flow path, liquid arriving at the outlet of a compartment may be collected as a fraction, or it may be reintroduced via pipelines to an inlet at a subsequent compartment.

As used herein, an 'inactive flow path' refers to a flow path wherein liquid is not actively flowing (e.g. not being pumped) through the compartments which constitute the flow path.

For example, in FIG. 1A, a four compartment separation loop is depicted. The interconnections between the compartments are not shown, only the flow paths. The separation loop consists of two flow paths. The first flow path between compartments 1 and 2 is active because feed is being pumped into compartment 1 and simultaneously product fraction is being withdrawn from compartment 2. The second flow path between compartments 3 and 4 is inactive because although compartment 3 and 4 are connected there is no active flow of liquid between the compartments and nothing is fed to or withdrawn from these compartments.

In FIG. 1B, a four compartment separation loop is depicted. The interconnections between the compartments are not shown, only the flow paths. The separation loop consists of three flow paths. The first at column 1 is an active flow path as feed is actively entering column 1 and product fraction is being withdrawn from column 1. The second at column 2 is an active flow path as water is actively entering column 2 and product fraction is being withdrawn from column 2. The third flow path between compartments 3 and 4 is inactive because although compartment 3 and 4 are connected there is no active flow of liquid between the compartments and nothing is fed into or withdrawn from said compartments.

In FIG. 1C, a four compartment separation loop is depicted. The interconnections between the compartments are not shown, only the flow paths. The separation loop consists of one flow path. The flow path is active as liquid is actively flowing between all compartments in the separation loop. Neither feedstock or eluent is entering any of the compartments nor are any fractions being withdrawn from the compartments, however liquid in the system is flowing in a cyclical manner.

Stationary Phase

The stationary phase may be a chromatographic resin. In one embodiment, the stationary phase is an ion exchange resin. The ion exchange resin may be a cation exchange resin or an anion exchange resin. The resin is selected depending on the raw material mixture to be fractionated and/or the products to be recovered. Suitable resins and their properties are well known to those skilled in the art.

In one embodiment, the resin is polymer based. Preferably the polymer is comprised of styrene or acrylic monomers. Acrylic monomers may be selected from methyl acrylate, ethyl acrylate, butyl acrylate, methyl methacrylate, acrylonitrile and acrylic acids.

The styrene and acrylic skeleton may be crosslinked with a crosslinking agent, e.g. divinyl benzene (DVB). A suitable degree of crosslinking is from about 1% to about 20%, preferably from about 3% to about 15%, more preferably about 3% to about 8%.

The cation exchange resin may be a strongly acidic cation exchange resin or a weakly acidic cation exchange resin. The cation exchange resin may be in a monovalent and/or divalent metal form, such as $Na^+$ and/or $K^+$ form, or $Ca^{2+}$, $Ba^{2+}$, $Mg^{2+}$ and/or $Sr^{2+}$ form. Resins in $H^+$ and $NH_4^+$ form may also be useful. However, other ionic forms may be used.

The anion exchange resin may be a strong base or a weak base anion exchange resin, having preferably an acrylic skeleton. The anion exchange resins may be in $OH^-$, $Cl^-$ or $SO_4^{2-}$ form. However, other ionic forms may also be used.

One preferred stationary phase is a strongly acidic cation exchange resin in a monovalent metal form, which is predominantly in $Na^+$ and/or $K^+$ form. Another preferred stationary phase is a weakly acidic cation exchange resin in a monovalent metal form, which is predominantly in $Na^+$ and/or $K^+$ form.

The resins may also be gel-type resins. Manufacturers of suitable resins are Finex, Dow, Bayer and Rohm & Haas for example.

Carbonaceous pyropolymers and activated carbon bound to a polymer are also useful as stationary phases.

In one embodiment, the stationary phase has a mean bead size of about 50 μm to about 500 μm. Preferably, the mean bead size is about 50 μm to about 400 μm. Preferably, the mean bead size is about 50 μm to about 300 μm. Preferably, the mean bead size is about 50 μm to about 250 μm. More preferably, the mean bead size is about 50 μm to about 200 μm.

In one embodiment, the stationary phase has a mean bead size of about 100 μm to about 500 μm. Preferably, the mean bead size is about 100 μm to about 400 μm. Preferably, the mean bead size is about 100 μm to about 300 μm. Preferably, the mean bead size is about 100 μm to about 250 μm. More preferably, the mean bead size is about 100 μm to about 200 μm.

In one embodiment, the stationary phase has a mean bead size of about 200 μm to about 500 μm. Preferably, the mean bead size is about 200 μm to about 400 μm. Preferably, the mean bead size is about 200 μm to about 350 μm. More preferably, the mean bead size is about 200 μm to about 300 μm.

In one embodiment, the stationary phase has a mean bead size of about 250 μm to about 500 μm. Preferably, the mean bead size is about 250 μm to about 400 μm. Preferably, the mean bead size is about 250 μm to about 350 μm.

In one embodiment, the height of the stationary phase within the compartment is preferably about 0.2 to 6 metres. More preferably the height of the stationary phase within the compartment is about 0.2 to 5 metres. More preferably the height of the stationary phase within the compartment is about 0.2 to 4 metres. More preferably the height of the stationary phase within the compartment is about 0.2 to 3 metres. More preferably the height of the stationary phase within the compartment is about 0.5 to 2.5 metres. More preferably the height of the stationary phase within the compartment is about 0.5 to 2.0 metres.

In one embodiment, the height of the stationary phase within the compartment is preferably about 0.8 to 2.5 metres. More preferably the height of the stationary phase within the compartment is about 1.0 to 2.5 metres. More preferably the height of the stationary phase within the compartment is about 1.0 to 2.0 metres.

In one embodiment, the height of the stationary phase within the compartment is preferably about 1 to 5 metres. More preferably the height of the stationary phase within the compartment is about 1 to 4 metres. More preferably the height of the stationary phase within the compartment is about 1 to 3 metres.

In one embodiment, the height of the stationary phase within the compartment is preferably about 2 to 5 metres.

More preferably the height of the stationary phase within the compartment is about 2 to 4 metres. More preferably the height of the stationary phase within the compartment is about 2 to 3 metres.

The compartments may be partially or fully packed with stationary phase. Preferably the compartments are fully packed with stationary phase. As used herein, the term "fully packed" means that substantially all of the volume of the compartment is packed with stationary phase apart from the space occupied by the distribution and collection devices.

Separation Cycle

As used herein, 'separation cycle' refers to a sequence of steps which may be repeated. A cycle is a predetermined sequence of steps in a pre-determined order which includes at least one feeding step, circulating step and eluting step.

In one embodiment, a separation cycle comprises/consists of about 1 to about 50 steps.

In another embodiment, a separation cycle consists of about 2 to about 50 steps. In another embodiment, a separation cycle consists of about 10 to about 50 steps. In another embodiment, a separation cycle consists of about 10 to about 40 steps.

In another embodiment, a separation cycle consists of about 15 to about 40 steps. In another embodiment, a separation cycle consists of about 15 to about 30 steps. In another embodiment, a separation cycle consists of about 10 to about 30 steps.

In another embodiment, a separation cycle consists of about 6 to about 30 steps. In another embodiment, a separation cycle consists of about 6 to about 25 steps. In another embodiment, a separation cycle consists of about 6 to about 20 steps.

In one embodiment of the method of the invention, the separation cycle is performed between 1 and 5 times, preferably 1, 2 or 3 times, more preferably once.

As used herein, a 'feeding step' refers to a step in the separation cycle wherein a feedstock is introduced into the separation loop, and at least one fraction is withdrawn from the separation loop.

As used herein, a 'circulating step' refers to a step in the separation cycle wherein essentially no feedstock or eluent is supplied to the separation loop and essentially no fractions are withdrawn from the separation loop.

As used herein, an 'eluting step' refers to a step wherein an eluent is fed into the SMB system, and at least one fraction is withdrawn from the separation loop.

A step in the separation cycle may comprise/consist of one or more of the above feeding, circulating and/or eluting steps, i.e. these steps may be carried out simultaneously. Furthermore, said steps may be repeated one or more times during the cycle.

In each step of the separation cycle, a flow path or flow paths is/are created in the separation loop due to the arrangement of valves which control inflow and outflow of liquid from the compartments in the separation loop.

The skilled person would understand that typically the separation cycle is repeated until an equilibrated separation profile is reached and then the process is continued advantageously in equilibrium. The equilibrium is defined by the equilibrium of the separation profile. Equilibrium of the separation profile is typically reached after about 6 to 12 cycles, more typically about 6 to 10 cycles, more typically about 6 to 8 cycles. Equilibrium of the separation profile may be reached after about 7 cycles.

As used herein, 'separation profile' refers to the relationship between the constituents of the feedstock as they progress through the SMB system, preferably at equilibrium.

The separation profile may be observed by measuring the conductivity and/or density over time as liquid flows through the equilibrated system during a separation cycle. The separation profile comprises constituents having a low migration rate, constituents having an intermediate migration rate, and constituents having a high migration rate. Accordingly the separation profile is a complete or an essentially complete dry solids profile of the feedstock.

Method

In chromatographic simulated moving bed (SMB) processes, the components present in a feedstock are separated in a series of interconnected compartments comprising a stationary phase.

In sequential simulated moving bed processes, all of the fluid streams do not flow continuously. The streams are: the supply of feedstock and/or eluent, the circulation of the separation profile, and the withdrawal of fractions. The flow rate and the volumes of the different feeds and product fractions may be adjusted in accordance with the separation goals (yield, purity, capacity). The process commonly comprises three basic types of step: feeding, eluting and circulating.

In the method of the present invention a separation profile may be circulated more then once or less than once through the chromatographic separation loop before all predetermined fractions are taken out or before the next feed or feeds and eluent or eluent feeds of the next cycle are fed in.

Conventionally, and especially in a sequential simulated moving bed (SMB) chromatographic, a product or a recycle fraction are withdrawn from either the first compartment and/or the last compartment in the separation loop relative to compartment which received the feedstock in order to fully utilise the stationary phase.

In contrast, the present invention provides a method for fractionating a feedstock into two or more fractions by a chromatographic sequential simulated moving bed (SMB) system, wherein the SMB system comprises a separation loop comprising at least 2 compartments; and wherein the method comprises a separation cycle comprising at least one feeding step, at least one circulating step and at least one eluting step; and wherein at least two flow paths are present in the separation loop during each feeding step of the separation cycle; and at least one of said flow paths is an active flow path and at least one of said flow paths is an inactive flow path.

It has now surprisingly been found that by holding a part of the separation profile in the compartments which form the inactive flow paths, before reintroducing it into the separation profile at a subsequent step in the separation cycle, one or more of the following advantageous effects: high product fraction yields, high product fraction purities, high product fraction concentrations and high separation capacities.

In the method of the invention the product or products is/are recovered using a multi-step separation cycle comprising the following steps: feeding step, eluting step and circulating step.

The method of the invention is characterised in that in each feeding step at least two flow paths are present and at least one of the flow paths is an inactive flow path.

In the present invention a separation cycle is formed of predetermined steps, which are carried out in a predetermined order one or more times during the separation method.

The separation cycle comprises a) at least one feeding step, b) at least one circulating step and c) at least one eluting step. Each of these steps a) to c) can be carried out simultaneously. Steps a) and c) are used as many times as necessary until the separation profile has circulated through the chromatographic separation loop more than once or less than once during one cycle.

In one embodiment the separation cycle comprises 1 to 10 feeding steps, preferably 1 to 6 feeding steps, more preferably 1 to 5 feeding steps, more preferably 1, 2, 3 or 4 feeding steps.

In one embodiment, at least the first step in the separation cycle is a feed step. In another embodiment at least the first two steps in the separation cycle are feed steps. In another embodiment at least the first three steps in the separation cycle are feed steps.

In one embodiment the first 1, 2, 3, 4 or 5 steps in the separation cycle are feed steps.

In one embodiment, during at least one feeding step, the feedstock is fed into one of the compartments in an active flow path and at least one product fraction or recycle fraction is collected from the same and/or a subsequent compartment in the same flow path.

In one embodiment, during each feeding step, the feedstock is fed into one of the compartments in an active flow path and at least one product fraction or recycle fraction is collected from the same and/or a subsequent compartment in the same flow path.

In another embodiment, during at least one feeding step, the feedstock is fed into one of the compartments in an active flow path and at least one product fraction is collected from a subsequent compartment in the same flow path.

In another embodiment, during each feeding step, the feedstock is fed into one of the compartments in an active flow path and at least one product fraction is collected from a subsequent compartment in the same flow path.

In another embodiment, during at least one feeding step the feedstock is fed into one of the compartments in an active flow path and substantially simultaneously an eluent is fed into a subsequent compartment in the separation loop. Preferably in this embodiment, a product and/or recycle fraction is withdrawn from both of the compartments which receive the feedstock or eluent.

In another embodiment, the separation loop comprises 2n compartments and in at least one feeding step of the separation cycle n+1 flow paths are present and wherein at least one of the n+1 flow paths is an inactive flow path, and at least one of the n+1 flow paths is an active flow path; wherein n is a number between 1 and 20.

In another embodiment, the separation loop comprises 2n compartments and in each feeding step of the separation cycle n+1 flow paths are present and wherein at least one of the n+1 flow paths is an inactive flow path, and at least one of the n+1 flow paths is an active flow path; wherein n is a number between 1 and 20.

Preferably n is 1 to 14, more preferably n is 1 to 10, more preferably n is 1 to 8, more preferably 1 to 6, more preferably 1, 2, 3 or 4, more preferably 1, 2 or 3.

In one embodiment, the separation loop comprises 2n compartments and in at least one feeding step of the separation cycle n flow paths are present and wherein at least one of the n flow paths is an inactive flow path, and at least one of the n flow paths is an active flow path; wherein n is a number between 2 and 20.

In another embodiment, the separation loop comprises 2n−1 compartments and in at least one feeding step of the separation cycle n flow paths are present and wherein at least one of the n flow paths is an inactive flow path, and at least one of the n flow paths is an active flow path; wherein n is a number between 2 and 20.

In one embodiment, the separation loop comprises 2n compartments and in each feeding step of the separation cycle n flow paths are present and wherein at least one of the n flow paths is an inactive flow path, and at least one of the n flow paths is an active flow path; wherein n is a number between 2 and 20.

In another embodiment, the separation loop comprises 2n−1 compartments and in each feeding step of the separation cycle n flow paths are present and wherein at least one of the n flow paths is an inactive flow path, and at least one of the n flow paths is an active flow path; wherein n is a number between 2 and 20.

Preferably n is 2 to 14, more preferably n is 2 to 10, more preferably n is 2 to 8, more preferably 2 to 6, more preferably 2, 3 or 4, more preferably 2 or 3.

In one embodiment, at least one feeding step comprises only one or two inactive flow paths. In one embodiment, at least one feeding step comprises only one inactive flow path.

In one embodiment, each feeding step of the separation cycle comprises only one or two inactive flow paths. In one embodiment, each feeding step of the separation cycle comprises only one inactive flow path.

In one embodiment, in at least one feeding step of the separation cycle, the ratio of active to inactive flow paths is between about 3:1 and 1:3. In another embodiment the ratio of active to inactive flow paths is between about 2:1 and 1:2. In another embodiment, the ratio of active to inactive flow paths is about 2:1. In another embodiment, the ratio of active to inactive flow paths is about 1:1.

In one embodiment, in each feeding step of the separation cycle, the ratio of active to inactive flow paths is between about 3:1 and 1:3. In another embodiment the ratio of active to inactive flow paths is between about 2:1 and 1:2. In another embodiment, the ratio of active to inactive flow paths is about 2:1. In another embodiment, the ratio of active to inactive flow paths is about 1:1.

In one embodiment, in at least one feeding step of the separation cycle, the last flow path relative to the flow path which receives the feedstock is an inactive flow path.

In one embodiment, in each feeding step of the separation cycle, the last flow path relative to the flow path which receives the feedstock is an inactive flow path.

In one embodiment, in at least one feeding step of the separation cycle the number of compartments constituting the active flow paths is equal to the number of compartments which constitute the inactive flow paths.

In one embodiment, in each feeding step of the separation cycle the number of compartments constituting the active flow paths is equal to the number of compartments which constitute the inactive flow paths.

In one embodiment, the separation loop comprises/consists of four compartments and the method comprises a separation cycle comprising a feeding step, wherein the compartments constitute one active flow path and at least one inactive flow path. Preferably, the compartments constitute one active flow path and one inactive flow path.

In one embodiment of the present invention, the separation loop comprises/consists of four compartments and the method comprises a separation cycle comprising a feeding step, wherein a flow path between two consecutive compartments and a flow path between another two consecutive compartments are present, wherein one flow path is active and the other flow path is inactive.

In one embodiment of the present invention, the separation loop comprises/consists of four compartments and the method comprises a separation cycle comprising at least two feeding steps, wherein a flow path between two consecutive compartments and a flow path between another two consecutive compartments are present wherein one flow path is active and the other flow path is inactive.

In one embodiment of the present invention, the separation loop comprises/consists of four compartments and the method comprises a separation cycle comprising a feeding step, wherein two active flow paths consisting of one compartment each and an inactive flow path between the remaining two consecutive compartments are present. Preferably a feedstock is supplied to one of the active flow paths and an eluent is supplied to the subsequent active flow path.

In one embodiment of the present invention, the separation loop comprises/consists of four compartments and the method comprises a separation cycle wherein in at least one feeding step there are two compartments participating in active flow paths and two compartments participating in inactive flow paths.

In one embodiment of the present invention, the separation loop comprises/consists of four compartments and the method comprises a separation cycle wherein in at least two feeding steps there are two compartments participating in active flow paths and two compartments participating in inactive flow paths.

In one embodiment of the present invention, the separation loop comprises/consists of four compartments and the method comprises a separation cycle wherein in each feeding step there are two compartments participating in active flow paths and two compartments participating in inactive flow paths.

In one embodiment of the present invention, the separation loop comprises/consists of four compartments wherein the separation cycle comprises:

a) A feeding step wherein two compartments together form an active flow path, and preferably feedstock is fed to one compartment and product fraction withdrawn from the subsequent compartment in the active flow path, the remaining compartments forming inactive flow path(s); and/or b) A feeding step comprising two active flow paths consisting of one compartment each and one inactive flow path, preferably wherein feedstock is fed to one compartment and recycle fraction is withdrawn from the same compartment and eluent is fed to the compartment of the subsequent active flow path and product fraction is withdrawn from the same compartment; and/or c) A feeding step wherein the two compartments together form an active flow path, and preferably feedstock is fed to one compartment and product fraction withdrawn from the subsequent compartment, the remaining compartments forming inactive flow path(s).

In each of the above embodiments, the separation cycle may further comprise a circulating step, wherein essentially nothing is fed into or collected from the SMB system; an eluting step, wherein the eluent is fed into one of the compartments and at least one fraction is collected from the same or from the subsequent compartments; wherein the method comprises at least one feeding, circulating and eluting step per cycle.

In one embodiment, the one or more of the feeding, eluting and circulating steps may be carried out substantially simultaneously. In another embodiment, the feeding and eluting steps may be carried out substantially simultaneously.

In one embodiment, the separation profile is progressed more than once through the separation loop in each separation cycle.

In one embodiment, the separation profile is progressed about twice through the separation loop in each separation cycle.

In another embodiment, the separation profile is progressed less than once through the separation loop in each separation cycle.

In one embodiment, progression of the separation profile can be determined by measuring the total volume of liquid (feedstock and eluent) supplied during the separation cycle.

In one embodiment of the present invention, the separation profile is narrow and the chromatographic separation resin bed (stationary phase) required for good separation result is long. In this embodiment the separation profile is circulated through the chromatographic separation loop more than once, then the resin bed is well utilized. Well utilized means in this context that the separation profile essentially fills all packing material. The separation profile can be circulated for example 1.5 times, 1.7 times, twice, or 3 times etc. depending on the number of the columns. If the dry substance profile is circulated 1.5 times, it means that in a 6-column system the first step of the cycle is repeated during the next cycle three columns later. Advantageously the separation profile is circulated twice.

In another embodiment of the present invention the separation profile is long, i.e. broad and the bed length needed for the good separation is short then the separation profile is circulated less than once through the chromatographic separation loop before the first step of the next cycle. The separation profile can also be circulated, for example 0.7 times, through the chromatographic separation loop. This means that for example in a 10-column system the first step of the next cycle is repeated already after 7 columns.

The method of the invention is preferably carried out at a temperature between 10° C. and 90° C. More preferably a temperature of about 40° C. and 95° C. More preferably a temperature of about 60° C. and 95° C. More preferably a temperature of about 65° C. and 95° C. More preferably a temperature of about 65° ° C. and 90° C.

In another embodiment, the method of the invention is preferably carried out at a temperature between 20° C. and 90° C. More preferably a temperature of about 20° C. and 60° C. More preferably a temperature of about 20° C. and 40° C.

The method of the invention is preferably performed using a system pressure of about 1 bar to about 15 bar. More preferably about 1 bar to about 10 bar.

In one embodiment, the eluent employed is a solvent, such as alcohol, especially ethanol or water or a mixture thereof, especially a mixture of ethanol and water. Preferably the eluent used is water.

The method of the invention is preferably performed at a linear flow rate of about 0.4 to about 20 m/h, preferably the linear flow rate is from 1 to 12 m/h.

EXAMPLES

Reference Example 1—Chromatographic Separation of Molasses (NSRL)

The separation loop of the SMB system comprised four compartments connected in series, feed pump, circulation pumps, an eluent water pump as well as inlet and outlet valves for the various process streams. Each compartment contained a single resin bed of height 2.2 m and diameter 0.111 m. The resin used was strong acid cation (SAC), DVB 6.2%, mean particle size 283 μm.

The feed material was C-molasses diluted to Bx50 with Recycle fraction. The composition of the feedstock is provided in the table below.

| HPLC | %/DS |
|---|---|
| Sucrose | 58.89 |
| Betaine | 4.91 |
| Glu + Fru | 1.00 |
| Raffinose | 1.66 |
| Others | 33.54 |

The fractionation was performed by way of a 19 step separation cycle (FIG. 2) as set forth below. The separation cycle was run 10 times before withdrawing any fractions.

Step 1: 2.9l of feedstock was fed to column 1 at flowrate 70l/h and 2.9l of recycle fraction was collected from Column 4.

Step 2: 1.8 l of feedstock was fed to column 1 at flowrate 21l/h and 1.8l of Raffinate was collected from column 1. Simultaneously 1.5l of water was fed to column 2 at flowrate 90l/h and 1.5l recycle was collected from column 4.

Step 3: 1.8 l of feedstock was fed to column 1 at flowrate 21l/h and 1.8l of Raffinate was collected from column 1. Simultaneously 7.7l of water was fed to column 2 at flowrate of 90l/h and 7.7l sucrose was collected from column 4.

Step 4: 2.9l of feedstock was fed to column 1 at flowrate 70l/h and 2.9l of sucrose fraction was collected from Column 4.

Step 5: 2.5l was circulated in a loop at flowrate 70 L/h, formed by columns 1, 2, 3 and 4.

Step 6: 5.0l of water was fed to column 3 at flowrate 70l/h and 5.0l of raffinate was collected from column 2.

Step 7: 5.2l of water was fed to column 1 at flowrate 70l/h and 5.2l of betaine was collected from column 4.

Step 8: 4.6l of water was fed to column 1 at flowrate 65l/h and 4.6l raffinate was collected from column 3. Simultaneously 6.7l water was fed to column 4 at flowrate 90l/h and 6.7l of betaine was collected from column 4

Step 9: 5.0l was circulated in a loop at flowrate 70l/h, formed by columns 1, 2, 3 and 4.

Step 10: 4.6l of water was fed to column 1 at flowrate 70l/h and 4.6l raffinate was collected from column 4.

Step 11: 5.1l was circulated in a loop at flowrate 70l/h, formed by columns 1, 2, 3 and 4.

Step 12: 4.5l of water was fed to column 2 at flowrate 70l/h and 4.5l raffinate was collected from column 1.

Step 13: 5.4l was circulated in a loop at flowrate 70l/h, formed by columns 1, 2, 3 and 4.

Step 14: 4.5l of water was fed to column 3 at flowrate 70l/h, and 4.5l raffinate was collected from column 2.

Step 15: 5.4l was circulated in a loop at flowrate 70l/h, formed by columns 1, 2, 3 and 4.

Step 16: 4.5l of water was fed to column 4 at flowrate 70l/h and 4.5l raffinate was collected from column 3.

Step 17: 5.4l was circulated in a loop at flowrate 48l/h, formed by columns 1, 2, 3 and 4.

Step 18: 4.5l of water was fed to column 1 at flowrate 75l/h and 4.5l raffinate was collected from column 4.

Step 19: 2.1 l was circulated in a loop at flowrate 80l/h formed by columns 1, 2, 3 and 4.

The sucrose concentration, yield and purity of the fractions is provided below as well as the mean betaine concentration, yield and purity of the fractions.

Example 2—Chromatographic Separation of Molasses (INSRL)

The SMB system comprised four compartments connected in series, feed pump, circulation pumps, an eluent water pump as well as inlet and outlet valves for the various process streams. Each compartment contained a single resin bed of height 2.2 m and diameter 0.111 m. The resin used was strong acid cation (SAC), DVB 6.2%, mean particle size 283 μm.

The feed material was C-molasses (as used in Example 1) diluted to Bx50 with Recycle fraction. The composition of the feedstock is provided in the table below.

| HPLC | %/DS |
|---|---|
| Sucrose | 59.25 |
| Betaine | 6.88 |
| Glu + Fru | 0.90 |
| Raffinose | 1.82 |
| Others | 32.15 |

Figure 3:
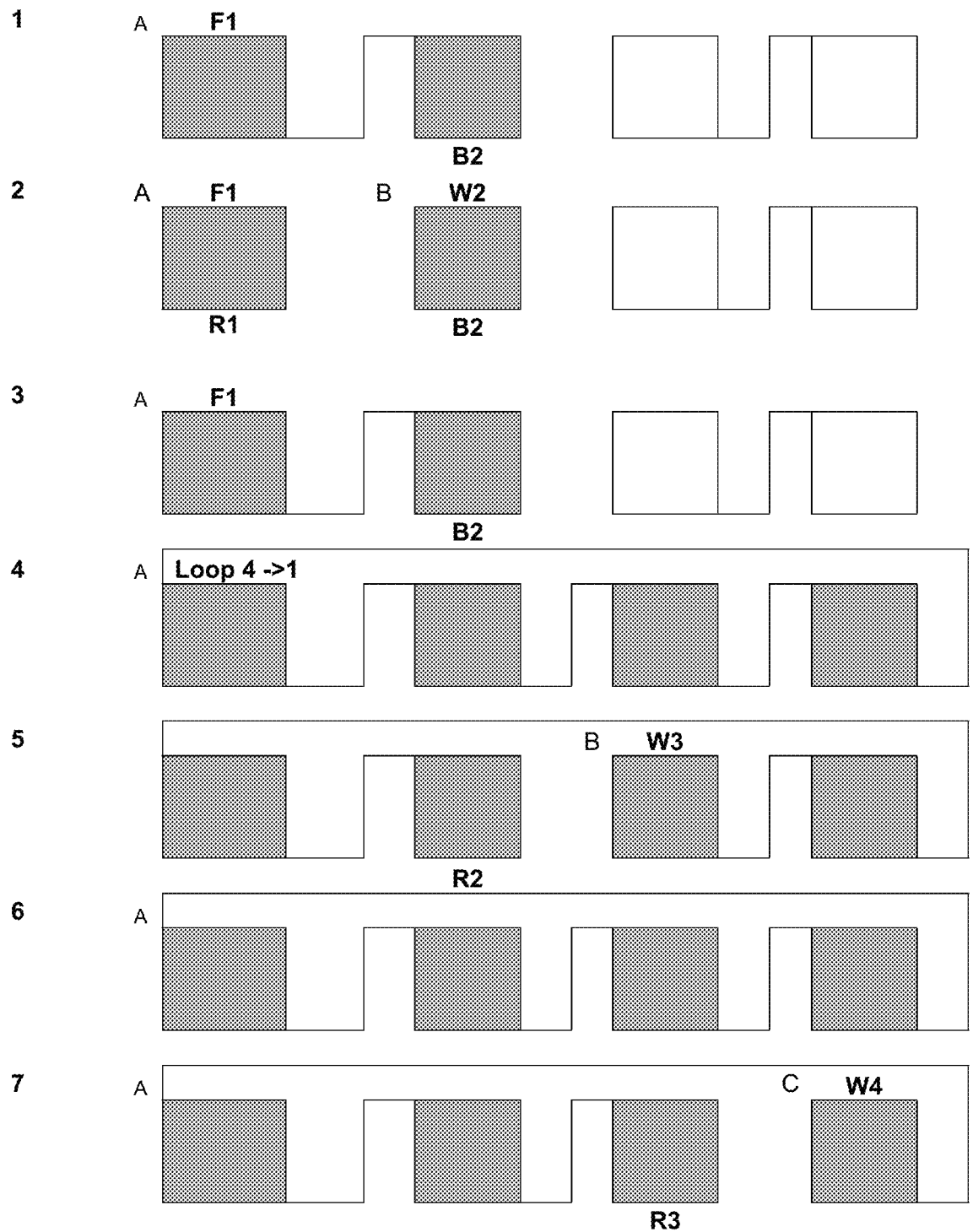
FIG. 3 depicts the steps in the separation cycle of Example 2.
Figure 5:
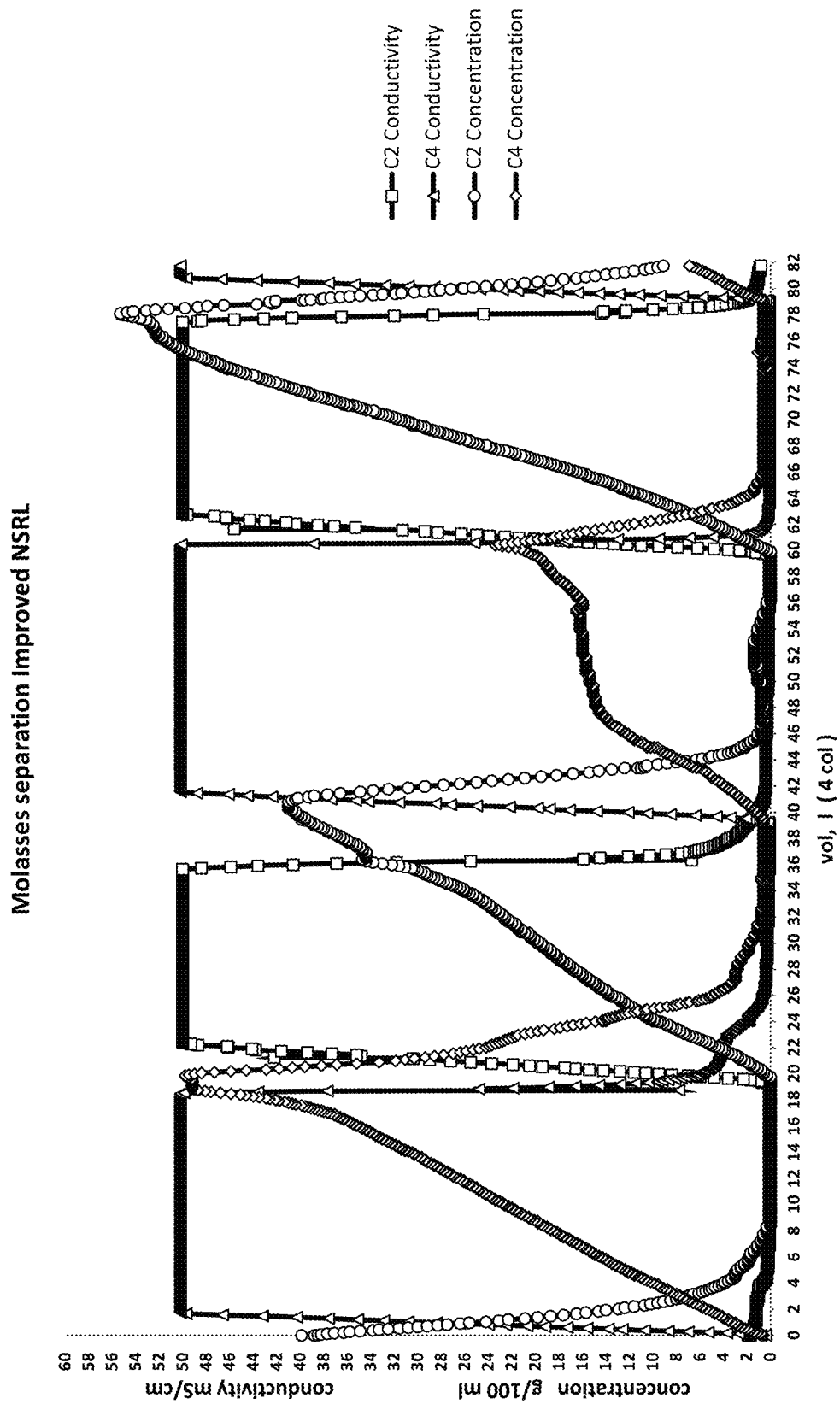
FIG. 5 depicts the separation profile formed in the separation cycle of Example 2.

The fractionation was performed by way of a 19 step separation cycle (FIG. 3) as set forth below. The separation cycle was run 10 times before withdrawing any fractions.

Step 1: 2.9l of feed solution was fed to column 1 at flowrate 60l/h and 2.9l of betaine fraction was collected from column 2. Simultaneously columns 3 and 4 were inactive.

Step 2: 4.5 l of feed was fed to column 1 at flowrate 56l/h and 4.5l of Raffinate was collected from column 1. Simultaneously 5.0l of water was fed to column 2 at flowrate 68l/h and 5.0l betaine was collected from column 2. Simultaneously columns 3 and 4 were inactive.

Step 3: 1.0l of feed solution was fed to column 1 at flowrate 60l/h and 1.0l of betaine fraction was collected from column 2. Simultaneously columns 3 and 4 were inactive.

Step 4: 4.3l was circulated in a loop at flowrate 50l/h, formed by columns 1, 2, 3 and 4.

Step 5: 4.5l of water was fed to column 3 at flowrate 50l/h and 4.5l of raffinate was collected from column 2.

Step 6: 5.2l was circulated in a loop at flowrate 55l/h formed by columns 1, 2, 3 and 4.

Step 7: 4.5l of water was fed to column 4 at flowrate 60l/h and 4.5l raffinate was collected from column 3.

Step 8: 5.2l was circulated in a loop at flowrate 60l/h formed by columns 1, 2, 3 and 4.

Step 9: 4.3l of water was fed to column 1 at flowrate 60l/h and 4.3l raffinate was collected from column 4.

Step 10: 5.0l was circulated in a loop at flowrate 60l/h, formed by columns 1, 2, 3 and 4.

Step 11: 4.2l of water was fed to column 2 at flowrate 60l/h and 4.2l raffinate was collected from column 1.

Step 12: 5.4l was circulated in a loop at flowrate 60l/h formed by columns 1, 2, 3 and 4.

Step 13: 4.1l of water was fed to column 3 at flowrate 60l/h and 4.1l raffinate was collected from column 2.

Step 14: 5.2l was circulated in a loop at flowrate 60l/h formed by columns 1, 2, 3 and 4.

Step 15: 4.2l of water was fed to column 4 at flowrate 65l/h and 4.2l raffinate was collected from column 3.

Step 16: 5.4l of water was fed to column 3 at flowrate 63l/h and 5.4l sucrose was collected from column 2.

Step 17: 4.0l of water was fed to column 1 at flowrate 65l/h and 4.0l sucrose was collected from column 2. Simultaneously 4.0l of water was fed to column 3 at flowrate 65l/h and 4.0l of raffinate was collected from column 4.

Step 18: 1.7l of water was fed to column 1 at flowrate 65l/h and 1.7l recycle fraction was collected from column 2. Simultaneously 1.1l of water was fed to column 3 at flowrate 65l/h and 1.1l of raffinate was collected from column 4.

Step 19: 2.1l of water was fed to column 3 at flowrate 60l/h and 2.1l of recycle fraction was collected from column 2.

The method was run twice and the mean sucrose concentration, yield and purity of the fractions is provided below as well as the mean betaine concentration, yield and purity of the fractions.

Results

|  | Sucrose conc. g/100 g | Betaine conc. g/100 g | Sucrose conc. g/100 ml | Betaine conc. g/100 ml |
|---|---|---|---|---|
| Example 1 (Reference) | 26.6 | 2.9 | 29.56 | 2.92 |
| Example 2 | 28.3 | 3.8 | 31.58 | 3.80 |

|  | Sucrose yield | Betaine yield | Sucrose purity | Betaine purity |
|---|---|---|---|---|
| Example 1 (Reference) | 92.2 | 88.2 | 92.7 | 76.7 |
| Example 2 | 93.0 | 93.1 | 92.6 | 79.5 |

The results demonstrate that the method of the invention provides a significant increase in the concentration of sucrose fraction and a large increase in the concentration of betaine fraction. Both sucrose and betaine yield are improved as well as betaine purity. Sucrose purity is maintained.

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law).

All headings and sub-headings are used herein for convenience only and should not be construed as limiting the invention in any way.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The citation and incorporation of patent documents herein is done for convenience only and does not reflect any view of the validity, patentability, and/or enforceability of such patent documents.

This invention includes all modifications and equivalents of the subject matter recited in the claims appended hereto as permitted by applicable law.

The invention claimed is:

1. A method for fractionating a feedstock into two or more fractions by a chromatographic sequential simulated moving bed (SMB) system,
   wherein the SMB system comprises a separation loop comprising at least three compartments; and
   wherein the method comprises a separation cycle comprising at least one feeding step, at least one circulating step and at least one eluting step; and
   wherein dissolved substances in the feedstock form a separation profile as they progress through the separation loop; and the separation profile is circulated more than once through the separation loop in each separation cycle;
   wherein at least two flow paths are present in the separation loop during each feeding step of the separation cycle; and at least one of said flow paths is an active flow path wherein liquid is actively flowing through the compartment(s) which constitute the flow path and at least one of said flow paths is an inactive flow path wherein liquid is not actively flowing through the compartments which constitute the flow path; and
   wherein a part of the separation profile is held in the compartments which form the inactive flow paths, before being reintroduced into the separation profile at a subsequent step in the separation cycle; and
   wherein the feedstock to be fractionated is beet molasses, vinasse, or low green.

2. The method according to claim 1, wherein during each feeding step a feedstock is fed into one of the compartments of an active flow path and at least one product fraction or recycle fraction is collected from the same or a subsequent compartment in the same flow path.

3. The method according to claim 1, wherein, during at least one feeding step, a feedstock is fed into one of the compartments in an active flow path and at least one product fraction is collected from a subsequent compartment in the same flow path.

4. The method according to claim 1, wherein, during at least one feeding step, a feedstock is fed into one of the compartments in an active flow path and substantially simultaneously an eluent is fed into a subsequent compartment in the separation loop.

5. The method according to claim 4, wherein a product or recycle fraction is withdrawn from each of the compartments which receive the feedstock or eluent.

6. The method according to claim 1, wherein the separation loop comprises 2n compartments and in at least one feeding step of the separation cycle n+1 flow paths are present and wherein at least one of the n+1 flow paths is an inactive flow path and at least one of the n+1 flow paths is an active flow path; wherein n is a number between 2 and 20.

7. The method according to claim 6, wherein n is 2 to 14.

8. The method according to claim 1, wherein the separation loop comprises 2n−1 compartments and in at least one feeding step of the separation cycle n flow paths are present and wherein at least one of the n flow paths is an inactive flow path and at least one of the n flow paths is an active flow path; wherein n is a number between 2 and 20.

9. The method according to claim 8, wherein n is 2 to 14.

10. The method according to claim 1, wherein each feeding step of the separation cycle comprises only one or two inactive flow paths.

11. The method according to claim 1, wherein the ratio of active to inactive flow paths in each feeding step is between 3:1 and 1:3.

12. The method according to claim 1 wherein the ratio of active to inactive flow paths in each feeding step is 1:1.

13. The method according to claim 1, wherein in each feeding step of the separation cycle the last flow path in the separation loop relative to the flow path which receives the feed is an inactive flow path.

14. The method according to claim 1, wherein in each feeding step the number of compartments constituting the active flow paths is equal to the number of compartments which constitute the inactive flow paths.

15. The method according to claim 1, wherein the separation loop comprises four compartments and the method comprises a separation cycle comprising a feeding step, wherein a flow path between two consecutive compartments and a flow path between another two consecutive compartments are present, wherein one flow path is active and the other flow path is inactive.

16. The method according to claim 1, wherein the separation loop comprises four compartments and the method comprises a separation cycle comprising a feeding step, wherein two active flow paths consisting of one compartment each and an inactive flow path between the remaining two consecutive compartments are present.

17. The method according to claim 1, wherein the separation loop comprises four compartments and the method comprises a separation cycle wherein in each feeding step there are two compartments participating in active flow paths and two compartments participating in inactive flow paths.

18. The method according to claim 1, wherein one or more of the feeding, eluting and circulating steps are carried out substantially simultaneously.

19. The method according to claim 1, wherein the separation profile is progressed twice through the separation loop in each separation cycle.

20. The method according to claim 1, wherein the compartments comprise a stationary phase selected from a chromatographic resin.

21. The method according to claim 1, wherein the compartments comprise a cation exchange resin.

22. The method according to claim 1, wherein the compartments comprise a weakly acidic cation exchange resin.

23. The method according to claim 1, wherein the compartments comprise a strongly acidic cation exchange resin.

24. The method according to claim 4, wherein the eluent is water.

25. The method according to claim 1, wherein the SMB system has a linear flow rate of 0.4 to 20 m/h.

26. The method of claim 1, wherein a product fraction comprises at least about 3 g/100 ml of betaine or at least about 30 g/100 ml of sucrose.

* * * * *